Aug. 27, 1929.  A. F. MASURY ET AL  1,726,158
TIRE PROTECTING DEVICE
Filed April 14, 1928

Inventors:
Alfred F. Masury and
August H. Leipert
By their Attorneys
Redding, Greeley, O'Shea & Campbell Patented Aug. 27, 1929.

1,726,158

UNITED STATES PATENT OFFICE.

ALFRED FELLOWS MASURY AND AUGUST H. LEIPERT, OF NEW YORK, N. Y., ASSIGNORS TO INTERNATIONAL MOTOR COMPANY, OF NEW YORK, N. Y., A CORPORATION OF DELAWARE.

TIRE-PROTECTING DEVICE.

Application filed April 14, 1928. Serial No. 270,139.

The present invention relates to devices for protecting pneumatic tires of a motor vehicle from being punctured. It has particular application to the rearward rear wheels of a six wheel vehicle and is designed to reduce the frequent tire trouble which the tires mounted on these wheels experience. In practice, it has been found that the tires carried by the rear pair of wheels in a vehicle of the four wheel drive type become punctured far more frequently than those of the forward truck. This is because the forward tires in the rear truck pick up nails and tacks, etc. from the roadway and turn them on end. The rear tires, tracking the forward tires, pass over these tacks and nails and become punctured. The spacing between the two wheels on either side of the trucks being comparatively short, increases the possibility of puncture, since the forward wheel frequently throws the tack or nail directly against that portion of the rear tire which is approaching the roadbed.

An object of this invention is to provide a means for eliminating, positively, all puncturing of the rear tires from nails or tacks which are thrown back or stood on end by the forward tires. The specific construction by which this is accomplished includes an electromagnet and screen mounted between the wheels on either sides of the truck to pick up and hold the above mentioned tacks.

Other objects will appear as the invention is described more fully in connection with the accompanying drawings, wherein.

Figure 1:
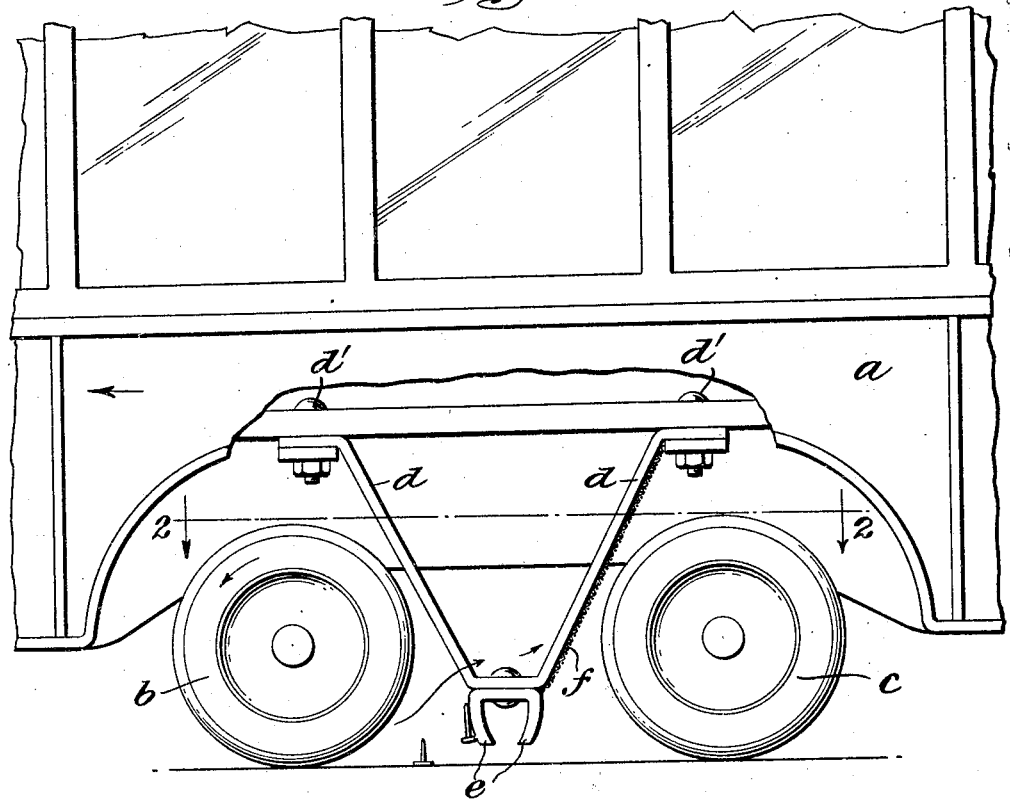
Figure 1 is a view in side elevation, partly broken away, showing the manner in which the protective device is mounted.
Figure 2:
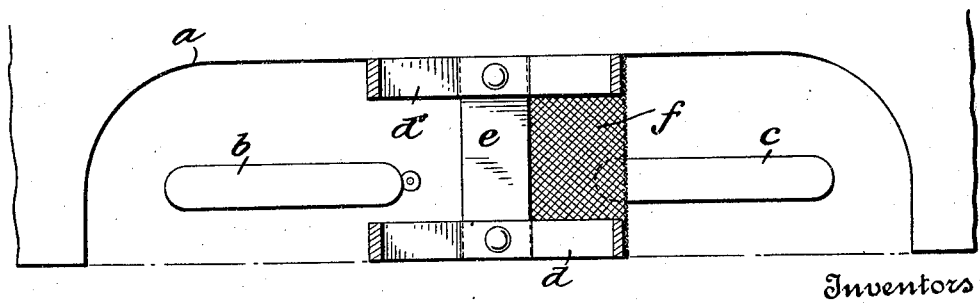
Figure 2 is a view in section, taken on line 2—2 of Figure 1, and looking in the direction of the arrows.

Referring to the above drawings, $a$ indicates the body of a vehicle of the four wheel drive type having a rear truck, two side wheels of which are shown at $b$ and $c$, respectively. Wheel $b$ is the forward and wheel $c$ the rear side wheel of the truck and are mounted in any suitable manner upon the vehicle frame. Downwardly extending V-shaped brackets $d$ are mounted upon the frame as shown at $d'$, the lower extremities of the brackets carrying a magnet $e$. Secured between the rearward portions of the bracket $d$ is a screen $f$ which catches tacks and other articles thrown rearwardly by the tires on the front wheels.

All wire and steel articles turned up or thrown rearwardly by the forward tires are caught and held by the magnet $e$. This prevents puncturing of the rear tires by these articles and the tire service is materially improved.

The invention comprises the mounting of a screen and magnet immediately behind the forward wheels of the truck in order that they may cooperate in the above manner to prevent the puncturing of the rear tires.

We claim as our invention:

1. A tire protecting device for a vehicle having a plurality of wheels in tandem and in juxtaposition to each other, respectively, at one end of either side thereof comprising a bracket mounted between the wheels of one side, a screen carried by the bracket and extending between the wheels, and a magnet carried at the lower end of the bracket.

2. A tire protecting device for a vehicle having a plurality of wheels in tandem and in juxtaposition to each other, respectively, at one end of either side thereof comprising a bracket mounted between the wheels of one side, one portion thereof sloping downwardly and forwardly, a screen carried by the bracket and extending between the wheels, and a magnet carried at the lower end of the bracket.

This specification signed this 11th day of April A. D. 1928.

ALFRED FELLOWS MASURY.
AUGUST H. LEIPERT.